United States Patent [19]

Sann

[11] Patent Number: 5,200,067

[45] Date of Patent: Apr. 6, 1993

[54] DEVICE FOR MOUNTING A FILTER ELEMENT

[75] Inventor: Norbert Sann, Saarbrucken, Fed. Rep. of Germany

[73] Assignee: Hydac Filtertechnik GMBH, Sulzbach/Saar, Fed. Rep. of Germany

[21] Appl. No.: 799,439

[22] Filed: Nov. 26, 1991

[30] Foreign Application Priority Data

Dec. 8, 1990 [DE] Fed. Rep. of Germany ... 403919202

[51] Int. Cl.⁵ .......................................... B01D 35/027
[52] U.S. Cl. .................................. 210/172; 210/232; 210/448; 210/450; 210/453
[58] Field of Search ............ 210/172, 232, 238, 323.2, 210/448, 450, 452, 453, 459

[56] References Cited

U.S. PATENT DOCUMENTS

| | | | |
|---|---|---|---|
| 3,011,644 | 12/1961 | Farrell et al. | 210/453 |
| 3,155,614 | 11/1964 | Wendlenner | 210/453 |
| 3,273,715 | 9/1966 | Rosaen | 210/172 |

FOREIGN PATENT DOCUMENTS 1105848  5/1961  Fed. Rep. of Germany.
1909130  9/1970  Fed. Rep. of Germany.

OTHER PUBLICATIONS

Drawing No. SB 10 Z 0080-d of HYDAC Filtertechnik dated Sep. 1989.

Primary Examiner—Matthew O. Savage
Attorney, Agent, or Firm—Roylance, Abrams, Berdo & Goodman

[57] ABSTRACT

A device for mounting a filter element is located in a housing. The housing is sealed on its outside wall in contact with a mounting member. The mounting member is mounted on an inside partition of the container by a sealing connection. This sealing connection has a sealing element inserted between sealing surfaces of the mounting member and the inside partition. A holding device for fixing the position of filter element in the housing incorporates a pressure element which engages the filter element to secure the filter element against rotational movement relative to the housing.

5 Claims, 6 Drawing Sheets

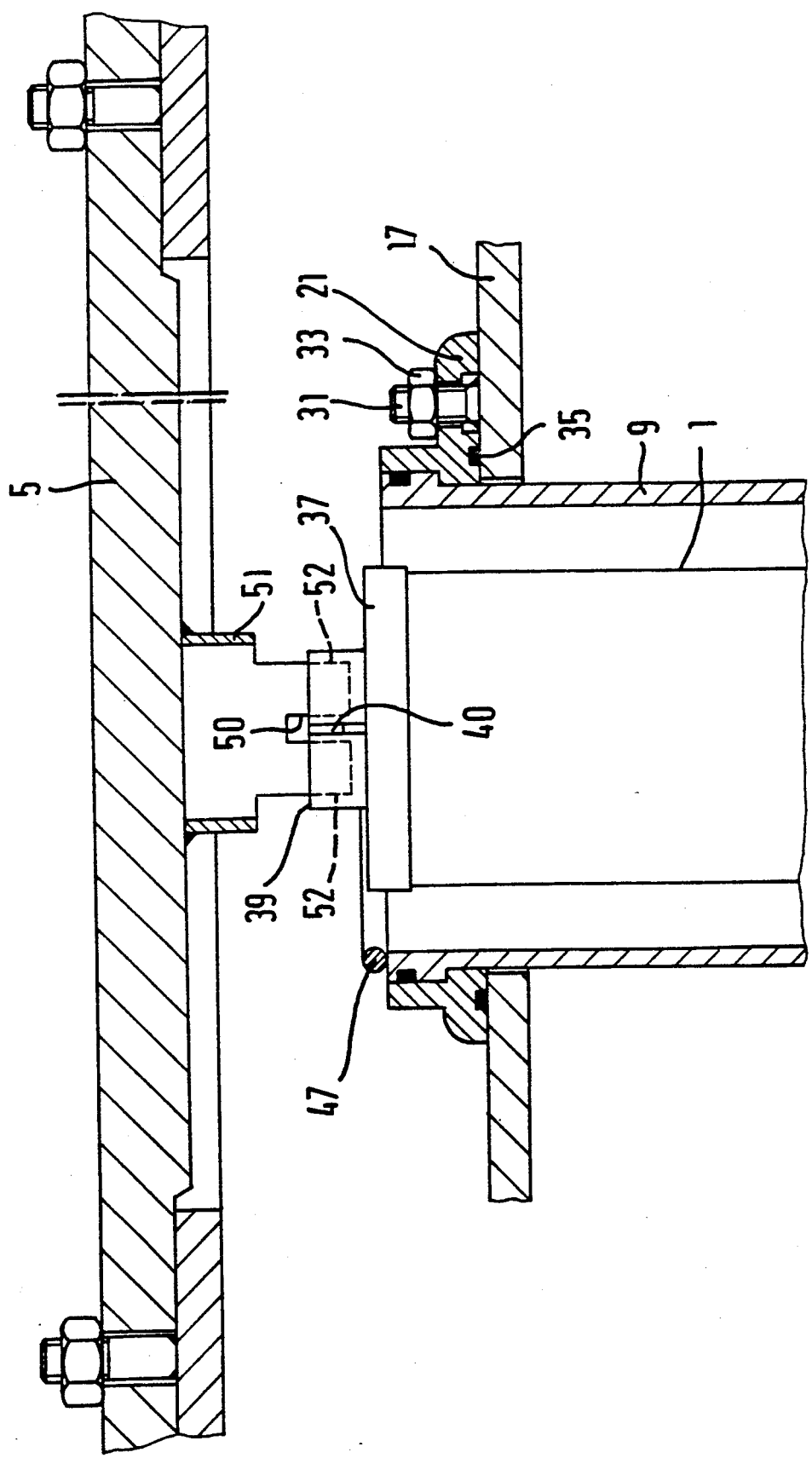

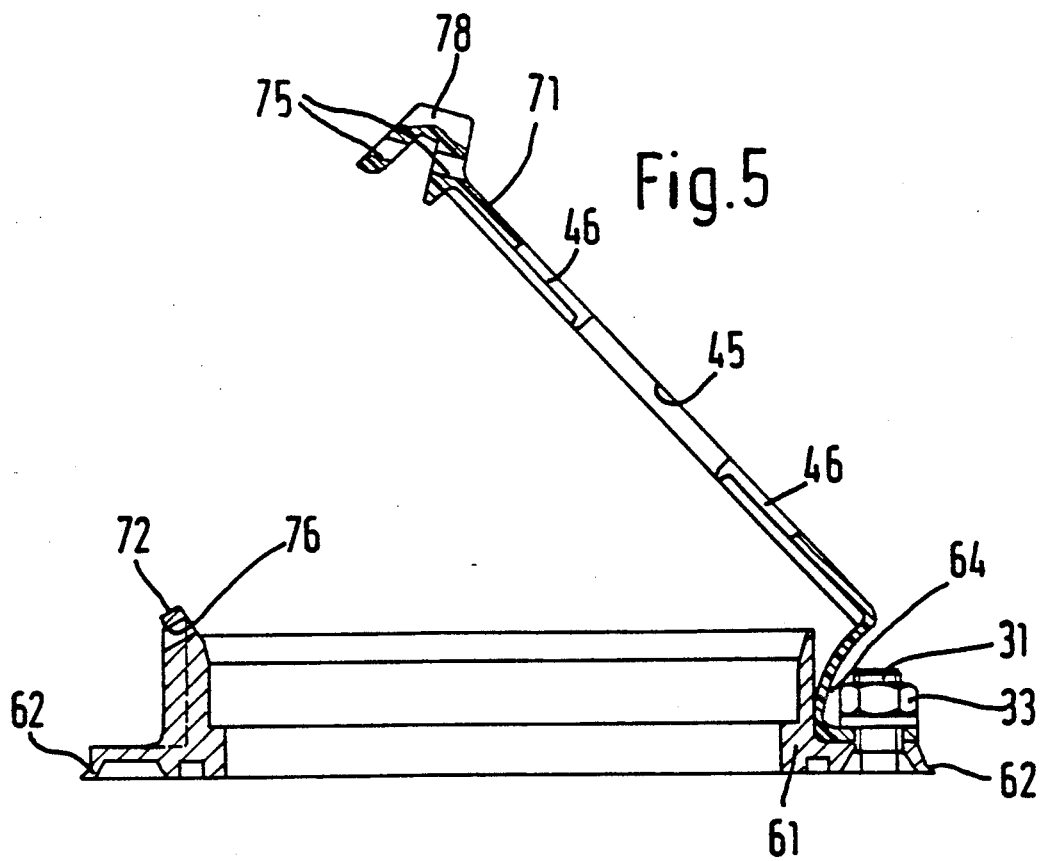
Fig. 5
Fig. 4
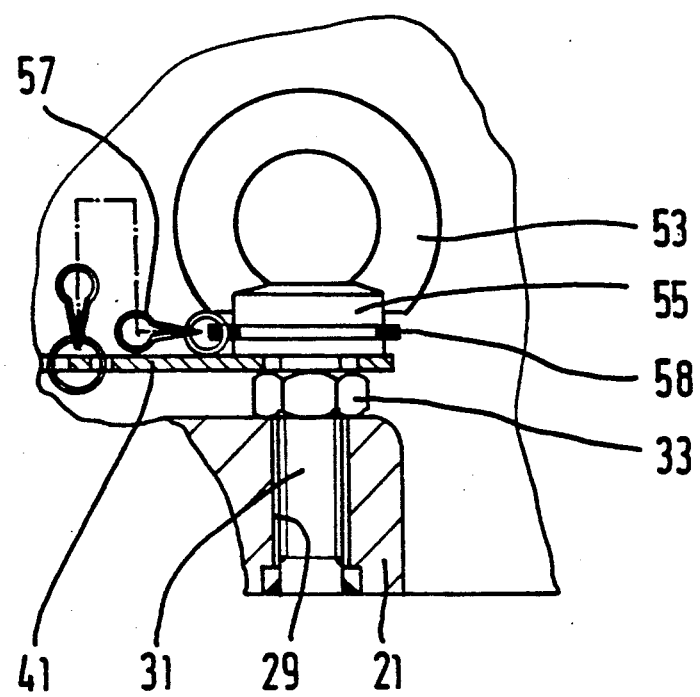

DEVICE FOR MOUNTING A FILTER ELEMENT

FIELD OF THE INVENTION

The present invention relates to a device for mounting a filter element in a housing. The housing has an entry opening and a discharge opening for a fluid, and a seat adjacent the discharge opening. The filter element can be pressed onto the discharge opening seat by a holding device. The holding device includes a pressure element which can be fitted to a contact surface of the filter element. A sealing element mounted on the seat separates the unfiltered fluid from the filtered fluid. At an area of the outside of the wall of the housing, the housing is in sealed contact through a second sealing element with a mounting member. The mounting member is fastened by a third sealing element and associated holding elements in sealed connection on one wall of a container.

BACKGROUND OF THE INVENTION

Devices of this type (e.g., German Offenlegungsschrift 19 09 130) are often used in connection with hydraulic units. In such uses, a filter element or several filter elements are incorporated in the associated container, for instance, in a tank for hydraulic fluid, as a return filter for the hydraulic fluid.

In the case of the filter elements, there can be a question of the need to change the filter cartridges when they become polluted. In addition, a pollution indicator device can be present in the assembly. Such devices can also be used advantageously, for instance, with the fuel or lubricant filters which are provided specifically for in-tank installation.

In the case of known devices of the this type, difficulties often arise while they are in operation. This is especially the case where the relevant fluid flows through the filter element at a relatively high flowthrough rate. As a result of the high flow forces, which thus engage on the filter element, undesirable changes in the position of the filter element relative to its housing often arise. Upon such position changes, among other things, even the seal between the filter element and its seat on the housing part can be influenced or damaged.

SUMMARY OF THE INVENTION

An object of the present invention is to provide a device for mounting a filter element in which a problem-free fixing of the position of the filter element within the housing is guaranteed.

This object is attained according to the present invention with a device for mounting a filter element wherein the pressure element of the holding device has at least one abutment surface adapted to be brought into keyed or interlocking engagement with a countersurface constructed on the contact surface of the filter element. Such arrangement ensures that the filter element will not rotate relative to the housing.

With the secure rotation prevention arrangement constructed according to the present invention on the holding device and cooperating with the filter element, with keyed or interlocking engagement between contact surfaces on the holding device and associated countersurfaces of the filter element, any rotational movement of the filter element relative to the housing is precluded. Such rotational movements of the filter element, as they arise with the known devices especially at higher flowthrough rates, lead to especially negative conditions in regard to the operational security of the filter arrangement.

The invention, on the other hand, guarantees problem-free fixing of the position of the filter element. In this manner, under all operational conditions, a satisfactory seal is maintained between the filter element and the seat on the housing.

The filter element mounted in the housing can be detachably connected with the housing, preferably by the holding device. The pressure element part of the holding device can be secured by one or more of the holding elements fastening the mounting member for the housing in which the filter element is mounted. With use of holding elements which are embodied as threaded bolts fastened to the inside wall of the container, the pressure element can be secured by the same nuts which serve for fixing the position of the mounting member.

The pressure element can also be connected with the mounting member. For instance, it can be pivotally mounted on the mounting member by a hinged connection.

In another exemplary embodiment, a container cover is provided on the container, with the pressure element of the holding device mounted on the inside of the cover. The pressure element in this case is configured so that it presses on the filter element when the container cover is brought into a closed position. The filter element is freed when the container cover is lifted from the container.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 3 is an enlarged, partial side elevational view in section of a device for mounting a filter element according to a second embodiment of the present invention;

FIG. 4 is a partial, enlarged side elevational view in section of a holding element for use in a modification of the embodiment of FIGS. 1 and 2;

FIG. 5 is a partial side elevational view in section of a mounting member and holding strap according to a third embodiment of the present invention, in which the holding strap is shown in a raised setting;

DETAILED DESCRIPTION OF THE INVENTION

Figure 1:
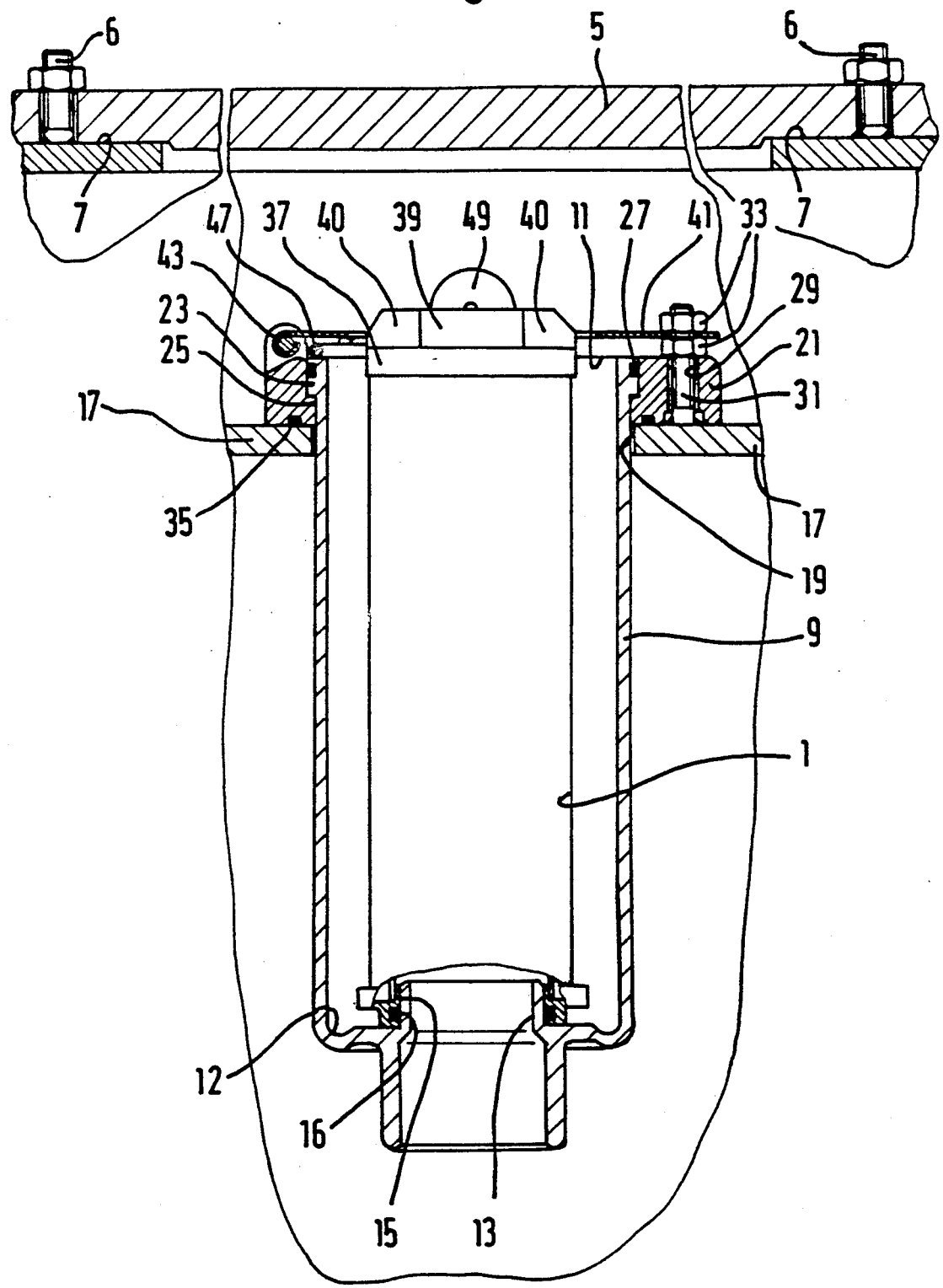
FIG. 1 is a partial side elevational view in section of a device for mounting a filter element according to a first embodiment of the present invention.
Figure 2:
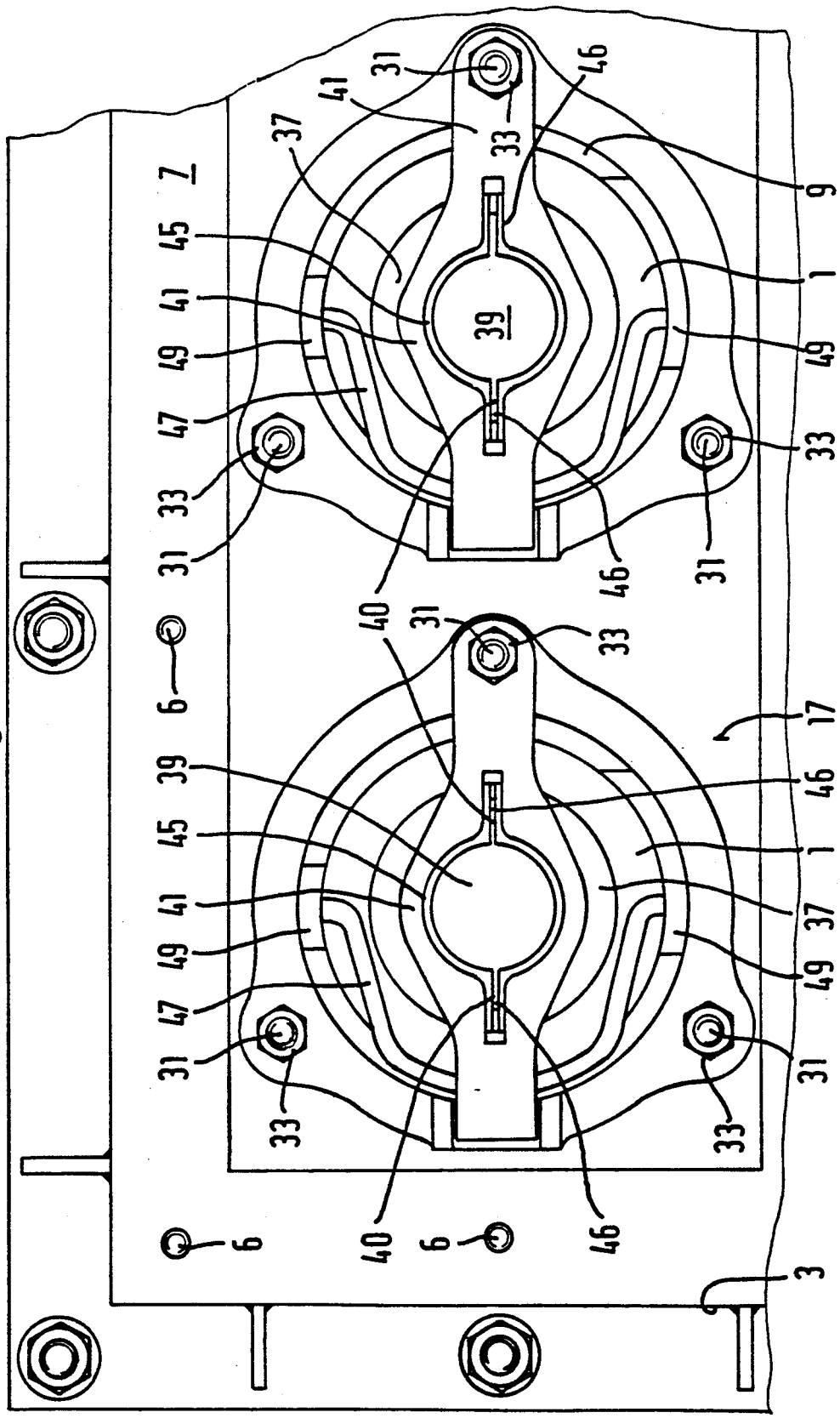
FIG. 2 is a top plan view of the device of FIG. 1 with a container cover removed.

FIGS. 1 and 2 show a first exemplary embodiment of a return filter device of a hydraulic unit. A plurality of filter elements 1 are brought together in a container. The container includes a tank 3 for hydraulic fluid. The shape of the tank periphery is illustrated in larger scale in FIG. 2.

FIG. 2 shows the tank 3 without a top cover, FIG. 1 shows the cover configured as a smooth container cover 5 which can be fastened by means of clamping bolts 6 onto a flat, seal-forming surface 7. Surface 7 extends continuously around the entire top edge of tank 3. When cover 5 is removed, filter elements 1 are freely accessible from above, in the area of the top interface 37, as shown in FIG. 2.

Filter elements 1 can be exchangeable and replaceable, cartridge-like filters of conventional construction. The filter medium of the filter elements,. for instance paper fleece, wire mesh or the like, can be adapted to the relevant fluid used in the operation and to the relevant operational pressure in any case. Each filter element 1, which is the exemplary embodiment, is of circular cylindrical form, and is located in a suitable housing in the form of a filter casing 9. As is conventional, casing 9 is adapted in form and dimensions to filter element 1, and thus, in the present case, forms an essentially circular body. Filter casing 9 is open at its top end 11, but is closed at the opposite bottom end 12. At bottom end 12, casing 9 has a central discharge opening or port 13 for discharge of the purified, filtered or cleansed fluid. Outside and adjacent discharge opening 13, a casing edge forms a seat 15 for supporting the inward-turned interface of filter element 1. A sealing element 16 seals the space between inside hollow chamber of filter element 1 and seat 15.

The top end 11 of filter casing 9, incorporating the entry opening for the fluid to be filtered, cleansed or purified, opens in that area of tank 3 containing the polluted fluid. This area lies above an inside partition 17 mounted horizontally in tank 3. Partition 17 forms a continuous separation wall between the top tank area for polluted fluid and the bottom area for filtered, cleansed or purified fluid. Partition 17 has a circular cylindrical break-through or opening 19 for each filter casing 9, into which opening the relevant filter casing 9 can be fitted from above when top cover 5 is removed. In its final position following insertion, the top open end 11 of filter casing 9 is located at a slight distance above inside partition 17. In this manner, the entry opening of filter casing 9 opens in the area of the uncleansed or unpurified fluid within tank 3.

To determine the final position of filter casing 9 relative to inside partition 17, a mounting member in the form of an annular member 21 is located at the opening edge of the break-through 19 of inside partition 17. The outside edge of top end 11 of filter casing 9 is received in the opening of annular member 21.

At the top end 11 of casing 9, a flange-like enlargement 23 extends radially outwardly. In the final position of filter casing 9, the inside shoulder surface of enlargement 23 is in contact with an annular shoulder 25, formed by a step in the annular opening of annular member 21. For sealing the outside wall of filter casing 9 to annular member 21, an annular groove is formed in the peripheral surface of flange-like enlargement 23, and a sealing element in the form of a sealing ring 27 is seated in this groove. Sealing ring 27 guarantees the seal opposite the inwardly oriented inside surface of annular member 21.

Annular member 21 in turn is held tightly or fixedly against inside partition 17 by a plurality of holding elements uniformly spaced from one another around the periphery of annular member 21. In the exemplary embodiment, clamping bolts are provided as holding elements. Three threaded bolts 31 are provided for each annular member 21. The threaded bolts 31 are each welded at one end to the top surface of inside partition 17, and form vertical studs arranged on the top of inside partition 17. These bolts extend through closely fitted bores 29 in annular member 21. Nuts 33 are threaded onto the threaded segments of threaded bolts 31 extending beyond member 21 to tighten annular members 21 on the top surface of inside partition 17. A sealing ring 35, seated in an annular groove formed in the surface of annular member 21 facing inside partition 17 and concentric to the annular opening, forms the seal between annular member 21 and inside partition 17.

On its top interface 37, adjacent to open end 11 of filter casing 9, filter element 1 has a centrally arranged circular cylindrically shaped projection 39 extending outwardly. Two wing-like tongues 40 extend from the sides of projection 39 diametrically opposite one another and radially outwardly relative to the longitudinal axis of filter element 1. At its interface 37, filter element 1 cooperates with a holding device which presses filter element 1 at its bottom end 12 onto seat 15 in filter casing 9. In the first embodiment, a pressure element for pressing filter element 1 is provided in the form of a sheet metal holding strap 41. One end of strap 41 is mounted pivotally by means of a hinge 43 on annular member 21. Strap 41 extends in its operative position over the interface 37 of filter element 1 parallel to inside partition 17, and is secured at its other end, opposite hinge 43, by a nut 33 screwed onto one of the threaded bolts 31 serving as a holding element for annular member 21. The part of holding strap 41 engaging over interface 37 of filter element 1 has a central clearance or cutout 45 (see FIG. 2) through which projecting part 39 extends. Slotted openings 46, extending in the longitudinal direction of holding strap 41 and the opening in cutout 45, receive tongues 40 on the interface 37 of filter element 1.

The present invention in the form of the first embodiment is operated as follows. When container cover 5 is removed, filter elements 1 are accessible at their free top interface 37. Following loosening of nut 33 holding strap 41 in its position extended over interface 37, as shown in FIGS. 1 and 2, the relevant holding strap 41 can be raised by pivoting it around the axis of hinge 43. Filter element 1 can now be raised and removed. After raising holding strap 41 and removing the pressing force, which force is transmitted through seat 15 onto filter casing 9, casing 9 can be moved upward, for instance, for cleaning. The flange-like enlargement 23 of filter casing 9 is raised from annular shoulder 25 on annular member 21.

To simplify removal of filter casing 9, each filter casing 9 is provided with a stirrup 47. Stirrup 47 is mounted to pivot in raised-up side edge segments 49 built into filter casing 9 at the top end 11. Segments 49 are arranged to face one another.

The inside surfaces of slotted openings 46 of each holding strap 41 form abutment surfaces. The abutment surfaces cooperate with tongues 40 of filter element 1 and engage the tongues to prevent rotation of filter element 1 around its longitudinal axis.

As shown in FIG. 1, break-through 19 in inside partition 17 of tank 3 can be configured to be somewhat larger than the diameter of the annular opening of annular member 21. Annular member 21 forms the actual mounting member, in which filter casing 9 is held by formation of the seal. Thus, only annular member 21 need be very precisely tooled and positioned.

In the first embodiment of FIGS. 1 and 2, nut 33 serving to secure holding strap 41 in its operative position over interface 37 of filter element 1 and those nuts tightly securing annular member 21 are configured as standard hexagonal nuts. Nut 33, which must be loosened for raising and repositioning of holding strap 41, can also be secured undetachably by an additional device. A suitable structure for that purpose is described hereinafter in relation to the modified embodiment shown in FIG. 4.

Instead of mounting holding strap 41 pivotally at one end on a hinge 43 on annular member 21, the holding strap could also be secured at each end on a holder element of annular member 21. In this case, instead of the illustrated three threaded bolts 31 spaced from one another at angles of 120°, four holding elements would be provided at 90° spacing from one another.

The exemplary embodiment shown in FIG. 3 differs from the first embodiment only by the configuration of the holding device which secures filter element 1 and filter casing 9. Instead of a pressure element secured on annular member 21 and/or threaded bolt 31 serving as holding elements, this holding device has a pressure element in the form of a thrust piece 51 fastened to the inside of top container cover 5. When container cover 5 is closed, thrust piece 51 has a centering effect on the projecting part 39 of filter element 1 arranged facing the thrust piece. Catches 52 extend from thrust piece 51 beyond the interface of projecting part 39. Tongues 40 on interface 37 of filter element 1 extend into a slot-shaped opening 50 between catches 51, to secure filter element 1 from rotation.

FIG. 4 shows an embodiment of a holder device in which the pressure element is configured as holder strap 41, the same as in the example of FIGS. 1 and 2. The nut to be loosened for lifting holding strap 41 in this case is not configured as a hexagonal nut, but rather is configured as a special nut 55. Nut 55 is provided with a loop handle 53 so that it can be rotated manually, the same as a wing nut. In addition, nut 55 is undetachably secured by means of a safety chain 57. One end of chain 57 is secured to an annular disk 58 which rests like a circlet or snap ring, but rotatably, in an annular groove of nut 55.

Figure 6:
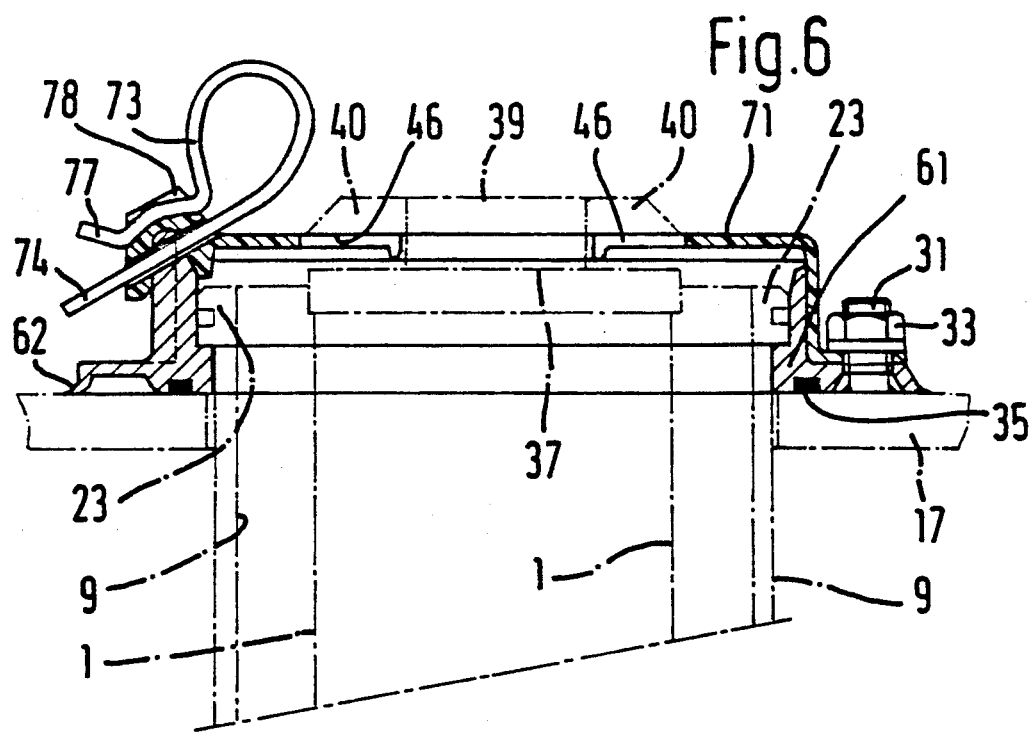
FIG. 6 is a partial side elevational view in section of the device of FIG. 5, in which the holding strap is shown in a lowered setting.
Figure 7:
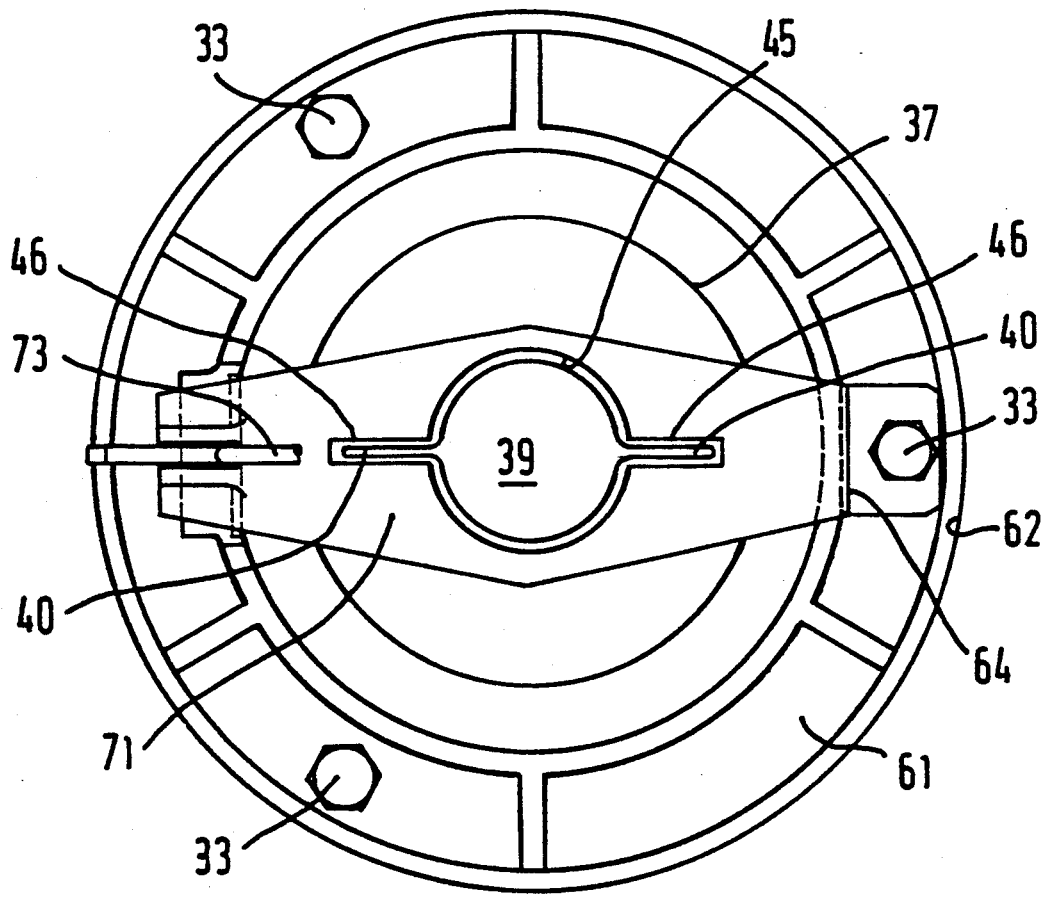
FIG. 7 is a top plan view of the device of FIG. 6.

FIGS. 5 to 7 show an embodiment in which the annular member 61 is fiberglass-reinforced plastic, not metal, and serves as mounting member in which the filter casing 9 is mounted with its flange-like end formed by the enlargement 23. In the same manner as the first exemplary embodiment, threaded bolts 31 with nuts 33 are provided as holding elements for retaining annular member 61. Annular member 61 has a sealing ring 35 for sealing the annular member to inside partition 17. Ring 35 corresponds to the aforementioned exemplary embodiments. Annular member 61 also has a tapered outside peripheral area which forms a sealing gasket 62 and under sealing pressure engages on inside partition 17.

The holding device has a holding strap 71, serving as pressure element, which is of fiberglass-reinforced plastic and is secured by nut 33 at one end of the holding strap on one of the threaded bolts 31. The area of holding strap 71 adjacent to this attachment point is sufficiently flexible to form a flexible hinge 64. The flexible hinge permits the holding strap to be pivoted for engagement on interface 37 of filter element 1 and to be lifted from interface 37. The end of holding strap 71 opposite flexible hinge 64 can be secured on the associated, raised edge segment 72 of annular member 61 by an insertion spring or clip 73. Clip 73 is bent into an generally hairpin shape. One of its arms is a straight spring-arm 74, which can be inserted into openings 75 and 76 in holding strap 71 and in annular member 61, respectively, as shown in FIG. 6. FIG. 6 also shows that the other spring-arm 77 engages in a groove 78 of holding strap 71, and clamps with spring force on the base of the groove, so that insertion spring 73 is secured tensionally to lock clip 73 in the inserted state.

In the area between its two ends, holding strap 71 is formed the same as holding strap 41 in the first embodiment, i.e., it has a central clearance or cutout 45 for receiving projection 39 of filter element 1 and has slotted openings 46 in clearance or cutout 45 which receive the tongues 40 of filter element 1, thus forming an assembly which prevent rotation.

Figure 8:
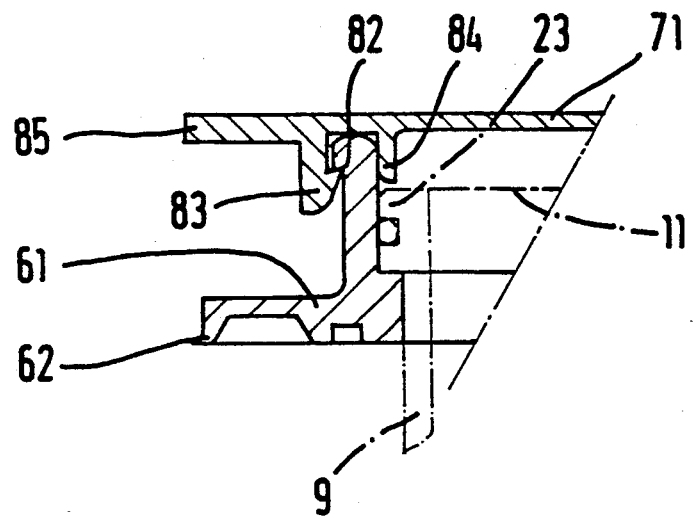
FIGS. 8 and 9 are partial, side elevational views in section of holding members and holding straps according to the fourth and fifth embodiments of the present invention.

FIG. 8 shows an embodiment in which holding strap 71 is connected with the associated, raised-up edge segment of annular member 61 by means of a snap catch. The snap catch includes a catch surface 82 on annular member 61, and a projecting catch member on a flexible catch 83 of the holding strip 71. Catch 83 engages catch surface 82 when holding strap 71 is brought into the catch position shown in FIG. 8. In this catch position, the raised-up edge segment of annular member 61 is held between catch 83 and a depending side wall 84 which is shaped to adapt to holding strap 71. The catch engagement is released by application of a lifting force at the outside end 85 of holding strap 71. Because of holding strap 71 being propped on side wall 84, only the outside end segment of holding strap 71 bends. In this manner, catch 83 with its projecting part comes out of engagement with catch surface 82.

Figure 9:
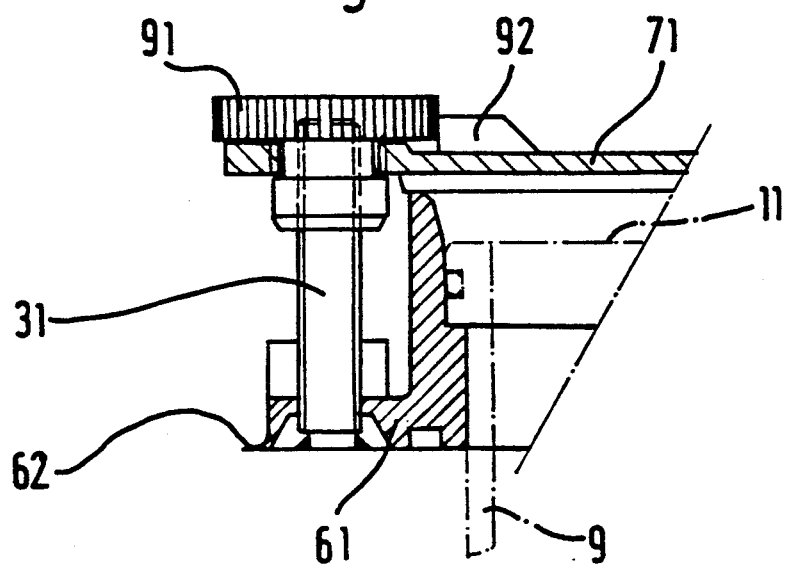

FIG. 9 shows an embodiment of the present invention in which the end of holding strap 71 opposite the flexible bending hinge is held tightly on one of the threaded bolts 31 by a milled or serrated nut 91. The milling or serrations around the periphery of milled nut 91 engage stop-catch 92 formed on the top of holding strap 71. Because of the flexibility of stop-catch 92, the stop-catch tensionally and rotationally locks milled nut 91.

While various embodiments have been chosen to illustrate the invention, it will be understood by those skilled in the art that various changes and modifications can be made therein without departing from scope of the invention as defined in the appended claims.

What is claimed is:

1. A filter device, comprising:
   a mounting member;
   a tubular housing coupled to said mounting member by holding elements, said housing having opposed ends, an entry opening at one of said ends and a discharge opening at the other of said ends;
   a tubular filter element mounted in said housing, said filter element having first and second opposed ends, said first end defining a contact surface, said contact surface including an outwardly projecting tongue thereon;
   a seat in said housing receiving the second end of said filter element;
   a holder attached to said mounting member, said holder including first means for engaging said contact surfaces of said filter element to press said second and against said seat, said first means including second means for preventing rotation of said filter element relative to said housing, said second means including at least one slot-shaped opening, defined by abutment-edges, receiving said outwardly projecting tongue on said contact surfaces of said filter element;

a first seal mounted on said seat to seal said second end of the filter element to said seat;

a second seal mounted between said mounting member and said housing; and a third seal mounted on said mounting member.

2. A device according to claim 1 wherein said first means is coupled to at least one of said holder elements.

3. A device according to claim 1 wherein said first means comprises a holding strap coupled to said mounting member by a connecting means.

4. A device according to claim 3 wherein said connecting means comprises a pivotable hinge.

5. A device according to claim 1 wherein a removable cover is detachably coupled to an outer wall of a tank receiving said housing, said cover providing for the inspection and removal of said housing and the filter element, said first means being mounted on an inside surface of said cover.

* * * * *

UNITED STATES PATENT AND TRADEMARK OFFICE
CERTIFICATE OF CORRECTION

PATENT NO. : 5,200,067
DATED : April 6, 1993
INVENTOR(S) : Norbert Sann It is certified that error appears in the above-identified patent and that said Letters Patent is hereby corrected as shown below:

On the title page,

"[30] Foreign Application Priority Data Dec. 8, 1990 [DE]
   Fed. Rep. of Germany ... 4039 19202"

should read

-- [30] Foreign Application Priority Data Dec. 8, 1990 [DE]
   Fed. Rep. of Germany 4039 192.2 --

In column 6, line 68, "and" should read -- end --.

In Column 6, line 67, the word "surfaces" should read --surface.

Signed and Sealed this

Twenty-fifth Day of January, 1994

*Attest:*

BRUCE LEHMAN

*Attesting Officer*     *Commissioner of Patents and Trademarks*